(12) United States Patent
Lin

(10) Patent No.: US 9,488,338 B2
(45) Date of Patent: Nov. 8, 2016

(54) YELLOW BACKLIGHT SYSTEM AND METHOD THEREOF

(71) Applicant: Po-Kang Lin, Taipei (TW)

(72) Inventor: Po-Kang Lin, Taipei (TW)

( * ) Notice: Subject to any disclaimer, the term of this patent is extended or adjusted under 35 U.S.C. 154(b) by 16 days.

(21) Appl. No.: 14/602,466

(22) Filed: Jan. 22, 2015

(65) Prior Publication Data

US 2016/0215958 A1 Jul. 28, 2016

(51) Int. Cl.
*F21V 13/04* (2006.01)
*F21V 5/04* (2006.01)
*F21V 7/00* (2006.01)

(52) U.S. Cl.
CPC ............... *F21V 13/04* (2013.01); *F21V 5/048* (2013.01); *F21V 7/0066* (2013.01); *F21Y 2113/10* (2016.08)

(58) Field of Classification Search
CPC ...... G09G 3/3413; G09G 2360/144; G09G 2320/0646; H05B 33/0872; F21Y 2113/10; F21Y 2113/00; F21Y 2113/002; F21Y 2113/005; F21Y 2113/02; F21V 13/02; F21V 13/04; F21V 13/12; G02F 1/00; G02F 1/13357

See application file for complete search history.

(56) References Cited

U.S. PATENT DOCUMENTS

2015/0378178 A1* 12/2015 Yang .................. G02C 7/104
351/159.56

* cited by examiner

*Primary Examiner* — Hargobind S Sawhney
(74) *Attorney, Agent, or Firm* — Lin & Associates Intellectual Property, Inc.

(57) ABSTRACT

Provided is a method for a yellow backlight, including the following steps of emitting blue light by a display device; and emitting yellow light into surroundings of the display device in a manner of refraction, reflection or a combination of reflection and refraction by at least one yellow light source to neutralize and decrease intensity of the blue light. The present invention further provides a system for a yellow backlight.

7 Claims, 5 Drawing Sheets

YELLOW BACKLIGHT SYSTEM AND METHOD THEREOF

BACKGROUND OF THE INVENTION

1. Field of the Invention

The present invention relates to a yellow backlight system and a method thereof for a display device or surroundings so as to reduce the impact on human visual cells due to blue light produced by a display device.

2. The Prior Arts

Nowadays, due to the popularity of electronic products such as computers, smartphones and so on, a user may use these electronic products having a screen interface for a long time. When a user looks at the screen interface for a long time, it may damage the user's eyes.

Blue light normally exists in lighting equipment and computer monitors. The blue light can be seen normally and is high-energy visible light which is closest to ultraviolet light. The wavelength of the blue light may be between 400 nm~500 nm. If eyes of a user are exposed to the blue light, macular degeneration may occur because of damage to retina.

In other words, if the human visual cells are exposed to the blue light for a long time, macular degeneration may result in a loss of vision in the center of the visual field due to damage to retina. It is a major cause of blindness because of macular degeneration.

Besides, the electronic products such as tablet PCs, computers, smartphones and so on may include high-resolution screen interface. The high-intensity blue light emitted by the high-resolution screen interface may damage the human visual cells.

At present, wearing a pair of glasses with blue-light blocking lenses may reduce the intensity of the blue light that enters the user's eyes. Generally, two kinds of blue-light blocking lenses may be used; one is dyed blue-light filtering lenses and the other is coated blue-light blocker lenses.

In addition, the dyed blue-light filtering lenses are commonly used because the blue-light filtering lenses are better than the coated blue-light blocker lenses.

However, the above solutions require a user to replace her/his glasses with new blue-light filtering lenses. It is inconvenient for a user who has already worn a pair of glasses. Besides, it may result in misjudging the color of an object when a user wears a pair of blue-light filtering glasses for a long time, for example, misjudging the colors of traffic lights.

SUMMARY OF THE INVENTION

In light of the foregoing drawbacks, an objective of the present invention is to provide a yellow backlight system and a method thereof, thereby reducing damage to the human visual cells of human body due to blue light produced by a display device.

For achieving the foregoing objective, the present invention provides a system for a yellow backlight, including: a display device having blue light; and at least one yellow light source emitting yellow light into surroundings of the display device in a particular manner to neutralize and decrease intensity of the blue light.

Preferably, a wavelength of the yellow light may be between 570 nm and 590 nm.

Preferably, the particular manner may be refraction.

Preferably, the particular manner may be reflection.

Preferably, the particular manner may be a combination of reflection and refraction.

Preferably, the at least one yellow light source may be installed on the display device or around the display device.

Preferably, the system of the present invention may further include at least one transparent board that is installed on the display device, and the at least one yellow light source may be installed on the at least one transparent board.

For achieving the foregoing objective, the present invention further provides a method for a yellow backlight, including the steps of emitting blue light by a display device; and emitting yellow light into surroundings of the display device in a particular manner by at least one yellow light source to neutralize and decrease intensity of the blue light.

Preferably, a wavelength of the yellow light may be between 570 nm and 590 nm, and the particular manner may be one of refraction, reflection, and a combination of refraction and reflection.

In comparison with the related art, the present invention may reduce the intensity of blue light without wearing a pair of blue-light blocking glasses, so as to decrease the impact on the human visual cells. With regard to users who already wear a pair of glasses, there is no need to replace the glasses with new blue-light blocking lenses that require extra cost. Further, the present invention may prevent users from misjudging colors while wearing a pair of blue-light blocking glasses for a long time.

BRIEF DESCRIPTION OF THE DRAWINGS

The present invention will be apparent to those skilled in the art by reading the following detailed description of a preferred exemplary embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate preferred exemplary embodiments of the invention and, together with the description, serve to explain the principles of the invention.

Figure 1:
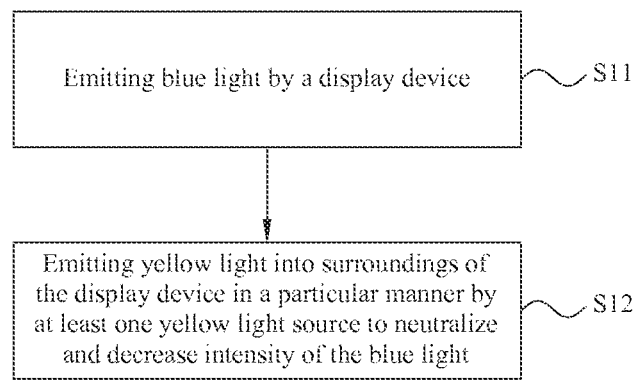
FIG. 1 is a flow chart illustrating a method for a yellow backlight according to a preferred exemplary embodiment of the present invention.

FIG. 1 is a flow chart illustrating a method for a yellow backlight according to a preferred exemplary embodiment of the present invention.

As shown in FIG. 1, in step S11, blue light may be emitted by a display device. In one embodiment of the present invention, the display device may be a device having a screen such as a notebook, a tablet PC, a PC, a smartphone, a television, etc. In one embodiment of the present invention, the blue light may be visible light whose wavelength is between 400 nm and 500 nm.

In step S12, yellow light may be emitted by at least one yellow light source into surroundings of the display device in a particular manner to neutralize and reduce intensity of the blue light. In one embodiment of the present invention, the particular manner may be reflection, refraction, a combination thereof or direct illumination. In one embodiment of the present invention, the yellow light may be visible light whose wavelength is between 570 nm and 590 nm. In one embodiment of the present invention, the yellow light source may be a kind of light source that emits yellow light, such as an incandescent lamp, a fluorescent lamp, a LED, a cold cathode tube, a gas discharge lamp, etc. The yellow light may be emitted in the particular manner to neutralize the blue light emitted by the display device and to decrease the intensity of the blue light, so as to protect the human visual cells from the illumination of intensive blue light.

Figure 2:
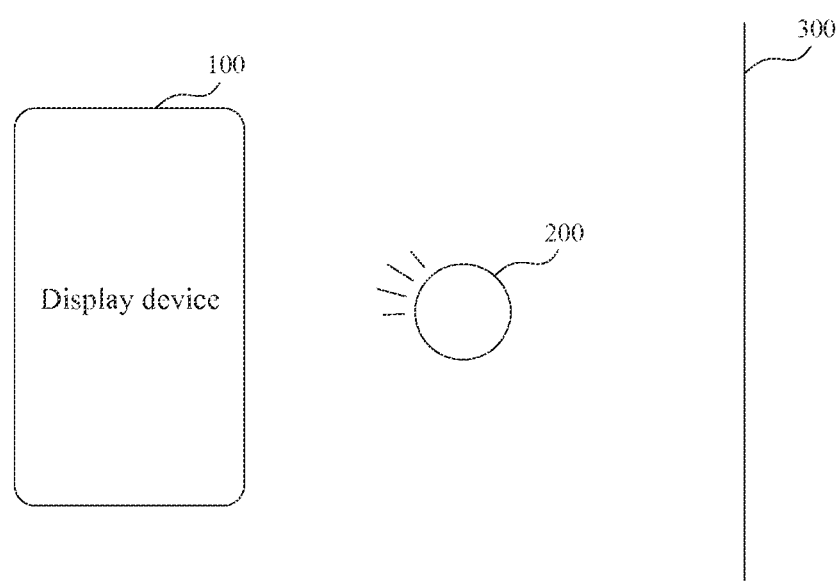
FIG. 2 is a schematic diagram illustrating a system for a yellow backlight at the side of a display device according to a preferred exemplary embodiment of the present invention.

FIG. 2 is a schematic diagram illustrating a system for a yellow backlight at the side of a display device according to a preferred exemplary embodiment of the present invention.

As shown in FIG. 2, the display device 100 may emit blue light, but the yellow light source 200 may emits yellow light so as to neutralize the blue light emitted by the display device 100. Accordingly, the yellow light source 200 may be installed in between a backside of the display device 100 and a wall 300. In the embodiment of the present invention, the yellow light source 200 may emit the yellow light to the wall 300, and then the yellow light may be reflected by the wall 300 towards the surroundings of the display device 100 in order to neutralize and reduce intensity of the blue light that is emitted by the display device 100. Therefore, the intensity of the blue light that seen by human eyes may be reduced such that the damage of the human visual cells may be effectively reduced. In the embodiment of the present invention, the display device 100 may be a device having a screen such as a notebook, a tablet PC, a PC, a smartphone, a television, etc. Further, in an embodiment of the present invention, the yellow light source 200 may be a kind of light source that may emit yellow light, such as an incandescent lamp, a fluorescent lamp, a LED, a cold cathode tube, a gas discharge lamp, etc.

Figure 3:
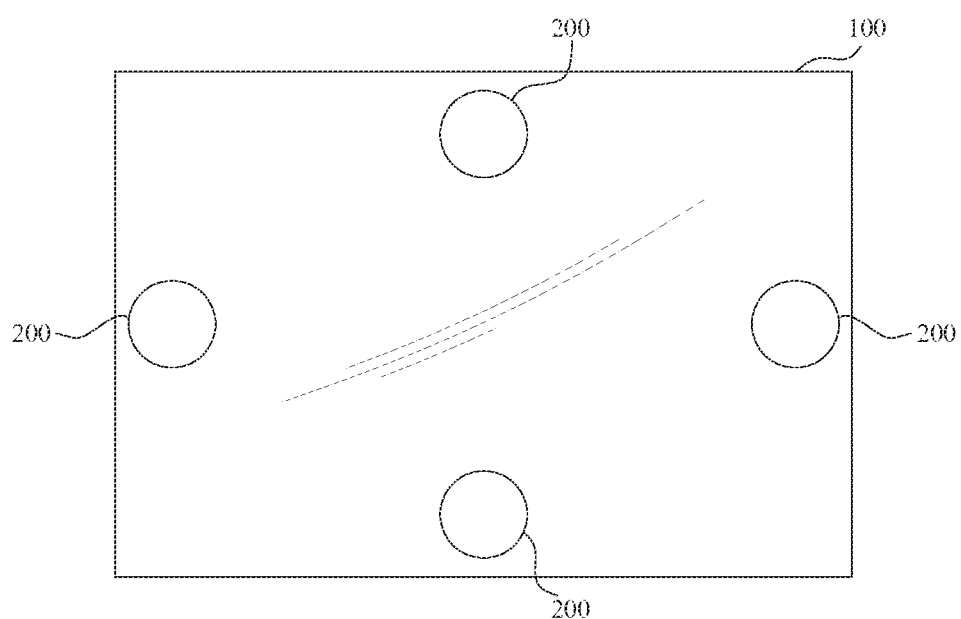
FIG. 3 is a schematic diagram illustrating the system for a yellow backlight at the back of a display device according to a preferred exemplary embodiment of the present invention.

FIG. 3 is a schematic diagram illustrating the system for a yellow backlight at the back of a display device according to a preferred exemplary embodiment of the present invention.

As shown in FIG. 3, a plurality of yellow light sources 200 may be installed at the backside of the display device 100. In one embodiment of the present invention, four yellow light sources 200 may be installed at the backside of the display device 100, but not limited to the present invention. Four yellow light sources 200 may emit yellow light from the backside of the display device 100 to bring about a technical effect of soft yellow light around the display device 100. The yellow light emitted by the yellow light sources 200 may be reflected towards the surroundings and the front of the display device 100 such that the blue light generated by the display device 100 may be neutralized and reduced in accordance with the embodiment of the present invention. Therefore, the intensity of the blue light that enters in the human eyes may be reduced so as to decrease the damage of the human visual cells.

Figure 4:
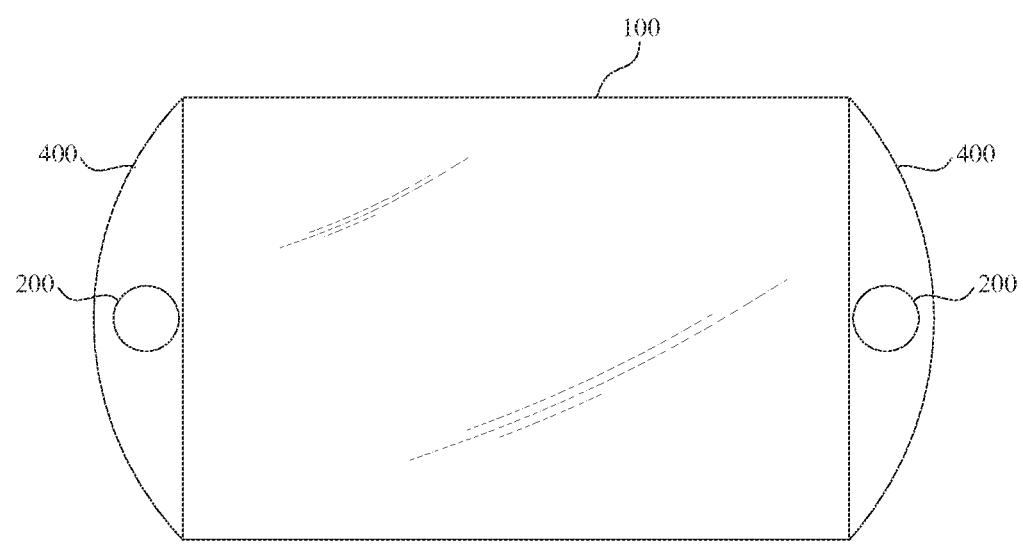
FIG. 4 is a schematic diagram illustrating the system for a yellow backlight at the back of a display device according to another preferred exemplary embodiment of the present invention.

FIG. 4 is a schematic diagram illustrating the system for a yellow backlight at the back of a display device according to another preferred exemplary embodiment of the present invention.

As shown in FIG. 4, two transparent boards 400 may be installed at the two sides of the display device 100 in accordance with another embodiment of the present invention, and the yellow light sources 200 may also be installed at the backside of the transparent boards 400. In another embodiment of the present invention, the yellow light source 200 may also be installed on the edge of the backside of the display device 100. In accordance with the embodiment of the present invention, two transparent boards 400 may be installed, but not limited the present invention. Accordingly, the yellow light emitted by the yellow light sources 200 may be refracted towards the surroundings and the front of the display device 100 through the transparent boards 400, so as to neutralize and reduce intensity of the blue light generated by the display device 100. Therefore, the intensity of the blue light that enters in the human eyes may be reduced such that the damage to the human visual cells may be effectively reduced. In one embodiment of the present invention, the transparent board 400 may be substances such as transparent resins, ground glasses, etc.

In one embodiment of the present invention, the yellow light emitted by the yellow light source 200 may also be refracted by the transparent boards 400 and may be reflected by the wall (not shown) close to the display device 100 towards the surroundings and the front of the display device 100 such that intensity of the blue light generated by the display device 100 may be effectively neutralized and reduced. Therefore, the intensity of the blue light that enters in the human eyes may be reduced, and the damage of the human visual cells may be effectively decreased.

In one embodiment of the present invention, the transparent board 400 may be a white transparent board. After the yellow light emitted by the yellow light source 200 is refracted by the white transparent board, the refracted light may remain yellow light. Therefore, the refracted yellow light may bring about the technical effect of neutralizing and reducing the intensity of the blue light.

In one embodiment of the present invention, the transparent board 400 may be a yellow transparent board, and the yellow light source 200 may be replaced by a white light source. After the white light emitted by the white light source is refracted by the yellow transparent board, the refracted light may remain yellow light. Therefore, the refracted yellow light may also bring about the effect of neutralizing and reducing the intensity of the blue light. Hence, the intensity of the blue light that enters the human eyes may be reduced such that the damage to the human visual cells may be decreased.

Figure 5:
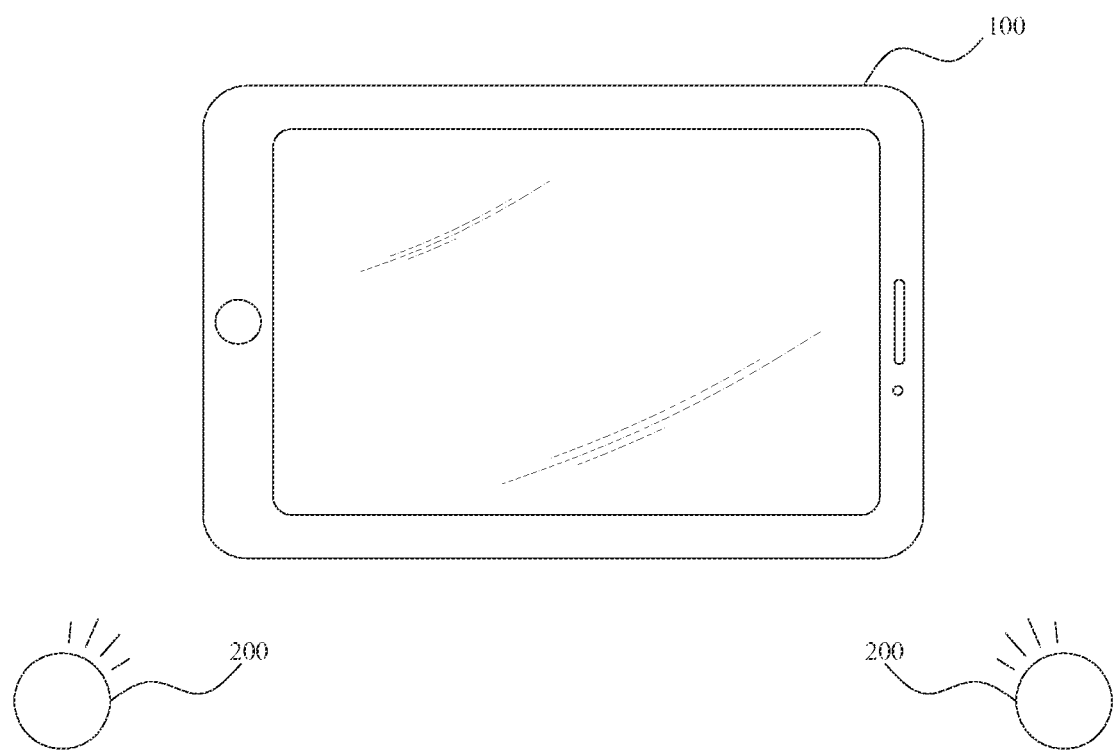
FIG. 5 is a schematic diagram illustrating the system for a yellow backlight at the front of a display device according to a preferred exemplary embodiment of the present invention.

FIG. 5 is a schematic diagram illustrating the system for a yellow backlight at the front of a display device according to a preferred exemplary embodiment of the present invention.

As shown in FIG. 5, two yellow light sources 200 may installed in front of the display device 100. The display device 100 may emit blue light, but the yellow light sources 200 may emit yellow light to neutralize the blue light emitted by the display device 100. The yellow light sources 200 may emit the yellow light into the frond of the display device 100 and the wall (not shown) close to the display device 100, and the yellow light may be reflected by both the display device 100 and the wall. The reflected soft yellow light may neutralize and reduce the blue light generated by the display device 100. Therefore, the intensity of the blue light that enters the human eyes may be reduced, and the damage of the human visual cells may be decreased.

In comparison with the related art, the present invention may reduce the intensity of blue light without wearing a pair of blue-light blocking glasses, so as to decrease the damage of human visual cells. For users who already wear a pair of glasses, there is no need to replace the glasses with new blue-light blocking lenses that require extra cost. Further, the present invention may prevent users from misjudging colors while wearing a pair of blue-light blocking glasses for a long time. Besides, in accordance with the present invention, since extra yellow light sources are placed at the backside of a display device or at the surroundings of a display device, the brightness of surroundings of a display device may be improved significantly. Moreover, users' eyes may be less prone to fatigue when users look at a display device for a long time.

The above preferred exemplary embodiment describes the principle and effect of the present invention, but is not limited to the present invention. It will be apparent to a person ordinarily skilled in the art that various modifications and variations can be made to the disclosed embodiments. It is intended that the specification and examples be considered as exemplary embodiment only, with a true scope of the disclosure being indicated by the following claims and their equivalents.

Although the present invention has been described with reference to the preferred exemplary embodiments thereof, it is apparent to those skilled in the art that a variety of modifications and changes may be made without departing from the scope of the present invention which is intended to be defined by the appended claims.

What is claimed is:

1. A system for a yellow backlight, comprising:
   a display device, having blue light; and
   at least one yellow light source, emitting yellow light into surroundings of the display device with a physical structure of refraction, reflection or a combination of reflection and refraction from the at least one yellow light source to neutralize and decrease intensity of the blue light.

2. The system of claim 1, wherein a wavelength of the yellow light is between 570 nm and 590 nm.

3. The system of claim 1, wherein the at least one yellow light source is installed on the display device or around the display device.

4. The system of claim 1, further comprising at least one transparent board installed on the display device.

5. The system of claim 4, wherein the at least one yellow light source is installed on the at least one transparent board.

6. A method for a yellow backlight, comprising the steps of:
   emitting blue light by a display device; and
   emitting yellow light into surroundings of the display device with a physical structure of refraction, reflection or a combination of reflection and refraction from the at least one yellow light source by at least one yellow light source to neutralize and decrease intensity of the blue light.

7. The method of claim 6, wherein a wavelength of the yellow light is between 570 nm and 590 nm.

* * * * *